(12) United States Patent
Blinick et al.

(10) Patent No.: US 8,670,199 B2
(45) Date of Patent: Mar. 11, 2014

(54) DATA-DEPENDENT NOISE-PREDICTIVE MAXIMUM LIKELIHOOD DETECTION (DD-NPML) FOR MAGNETIC RECORDING

(75) Inventors: Katherine T. Blinick, Tucson, AZ (US); Evangelos S. Eleftheriou, Rueschlikon (CH); Robert A. Hutchins, Tucson, AZ (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 12/753,586

(22) Filed: Apr. 2, 2010

(65) Prior Publication Data

US 2011/0242692 A1   Oct. 6, 2011

(51) Int. Cl.
*G11B 5/09* (2006.01)

(52) U.S. Cl.
USPC ............................................. 360/39

(58) Field of Classification Search
USPC .......... 360/39, 65, 77.12, 78.02, 31; 375/229; 374/115; 714/786
See application file for complete search history.

(56) References Cited

U.S. PATENT DOCUMENTS

| | | | |
|---|---|---|---|
| 6,158,027 A | 12/2000 | Bush et al. | 714/709 |
| 6,625,235 B1 | 9/2003 | Coker et al. | 375/341 |
| 6,834,992 B2 * | 12/2004 | Draxton et al. | 374/115 |
| 7,522,367 B2 * | 4/2009 | Eleftheriou et al. | 360/65 |
| 8,006,172 B2 * | 8/2011 | Boyer et al. | 714/786 |
| 8,077,764 B2 * | 12/2011 | Eleftheriou et al. | 375/229 |
| 2005/0169412 A1 | 8/2005 | Yang et al. | 375/350 |
| 2006/0093075 A1 | 5/2006 | Radich | |
| 2007/0115574 A1 | 5/2007 | Eleftheriou et al. | 360/39 |
| 2008/0031114 A1 | 2/2008 | Hong et al. | 369/60.01 |
| 2009/0027242 A1 | 1/2009 | Cideciyan et al. | 341/95 |
| 2009/0089645 A1 | 4/2009 | Cideciyan et al. | 714/758 |
| 2009/0195909 A1 | 8/2009 | Eleftheriou et al. | 360/75 |

FOREIGN PATENT DOCUMENTS

| | | |
|---|---|---|
| WO | 97/11544 A1 | 3/1997 |
| WO | 03/088244 A2 | 10/2003 |

OTHER PUBLICATIONS

International Search Report and Written Opinion from PCT Application No. PCT/EP2011/054305 dated May 4, 2011.
Olcer et al., "Performance of Advanced Data-Detection Schemes on Barium-Ferrite Particulate Media," 2009 IEEE, IEEE Transactions on Magnetics, vol. 45, No. 10, Oct. 2009, pp. 3765-3768.
Kavcic et al., "The Viterbi Algorithm and Markov Noise Memory," 2000 IEEE, IEEE Transactions on Information Theory, vol. 46, No. 1, Jan. 2000, pp. 291-301.

(Continued)

*Primary Examiner* — Fred Tzeng
(74) *Attorney, Agent, or Firm* — Zilka-Kotab, PC (57) ABSTRACT

In one embodiment, a method includes applying one or more whitening filters to an input stream of digitized samples from a magnetic data channel to produce a filtered sequence, performing one or more branch metric calculations to the filtered sequence to produce a branch metric, and applying a multi-state data-dependent noise-predictive maximum likelihood (DD-NPML) detector to the branch metric to produce an output stream. In another embodiment, a multi-channel data storage system includes a head for reading data from a storage medium, logic for applying one or more whitening filters to an input stream of digitized samples from a magnetic data channel to produce a filtered sequence, logic for performing one or more branch metric calculations to the filtered sequence to produce a branch metric, and logic for applying a multi-state DD-NPML detector to the branch metric to produce an output stream. Other systems and methods are described as well.

20 Claims, 10 Drawing Sheets

(56) References Cited

OTHER PUBLICATIONS

Olcer et al., "Performance of Advanced Data-Detection Schemes on Barium-Ferrite Particulate Media" (©2009 IEEE, IEEE Transactions on Magnetics, vol. 45, No. 10, Oct. 2009.

Eleftherious et al., "Noise-Predictive Maximum-Likelihood (NPML) Detection for The Magnetic Recording Channel" ©1996 IEEE, Proceedings of ICC/SUPERCOMM '96—International Conference on Communications, Jun. 1996.

U.S. Appl. No. 12/360,777, filed Jan. 27, 2009.

\* cited by examiner

DATA-DEPENDENT NOISE-PREDICTIVE MAXIMUM LIKELIHOOD DETECTION (DD-NPML) FOR MAGNETIC RECORDING

BACKGROUND

In the field of magnetic storage systems, when reading data written on magnetic media in hard disk drives, tape drives, etc., distinct read-detect channels are used to detect the data that was written on the media. As the density of data written on the media increases due to competitive pressures, conventional read-detect methods and devices which read the data stored on the magnetic media often are not adequate to detect the data at the error rates required by the users of such methods and devices.

To address these issues, attempts have been made at improving the performance of data detectors in read channels for magnetic storage systems, in particular tape storage systems. Known solutions to improve the performance of data detectors in read channels that go beyond a standard detector design, such as partial response maximum likelihood (PRML) detection, noise-predictive maximum likelihood (NPML) detection, post-processing techniques, and other methods. However, even these methods and devices do not effectively compensate for the slight variations in the data being read, which may result in errors in the detected data.

Therefore, a better method of improving the performance of data detection in read channels for magnetic storage systems would be very beneficial in the field of magnetic storage systems.

SUMMARY

In one embodiment, a method includes applying one or more whitening filters to an input stream of digitized samples from a magnetic data channel to produce a filtered sequence, performing one or more branch metric calculations to the filtered sequence to produce a branch metric, and applying a multi-state data-dependent noise-predictive maximum likelihood (DD-NPML) detector to the branch metric to produce an output stream.

In another embodiment, a multi-channel data storage system includes a head for reading data from a storage medium, logic for applying one or more whitening filters to an input stream of digitized samples from a magnetic data channel to produce a filtered sequence, logic for performing one or more branch metric calculations to the filtered sequence to produce a branch metric, and logic for applying a multi-state data-dependent noise-predictive maximum likelihood (DD-NPML) detector to the branch metric to produce an output stream.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to preferred embodiments, a data-dependent noise-predictive maximum likelihood (DD-NPML) detection technique, which is an advancement on partial response maximum likelihood (PRML) techniques, may be used to detect data from a magnetic data storage device. The DD-NPML detector includes 32 predictor filters along with noise prediction performed on a data pattern basis. This detector is fully adaptable using least mean square (LMS) filtering techniques to derive the predictor filter coefficients. In addition, a mean square error (MSE) filter may be implemented to derive the variance of the data-dependent noise, providing improved data detection on magnetic data reading devices over conventional techniques and devices.

In one general embodiment, a method includes applying one or more whitening filters to an input stream of digitized samples from a magnetic data channel to produce a filtered sequence, performing one or more branch metric calculations to the filtered sequence to produce a branch metric, and applying a multi-state data-dependent noise-predictive maximum likelihood (DD-NPML) detector to the branch metric to produce an output stream.

In another general embodiment, a multi-channel data storage system includes a head for reading data from a storage medium, logic for applying one or more whitening filters to an input stream of digitized samples from a magnetic data channel to produce a filtered sequence, logic for performing one or more branch metric calculations to the filtered sequence to produce a branch metric, and logic for applying a multi-state data-dependent noise-predictive maximum likelihood (DD-NPML) detector to the branch metric to produce an output stream.

To place embodiments of the present invention in a context, the 16-state adaptive Data-Dependent NPML detector (referred to as a DD-NPML in this document) is intended to be used with 32 channel magnetic heads. One skilled in the art will appreciate that the various components of the DD-NPML detector may be scaled to work with a variety of systems having a variety of numbers of channels, e.g., 16, 64, 128, etc. The architecture of a 16-state adaptive DD-NPML detector is described below according to one embodiment. The implementation of the DD-NPML block is described according to some preferred embodiments, and the hardware impact is assessed. Of course, many additional embodiments of DD-NPML are possible, and the implementations are not meant to be limited by what is described herein, which is for illustrative purposes only. Any conceivable implementation of DD-NPML may be used.

Figure 1:
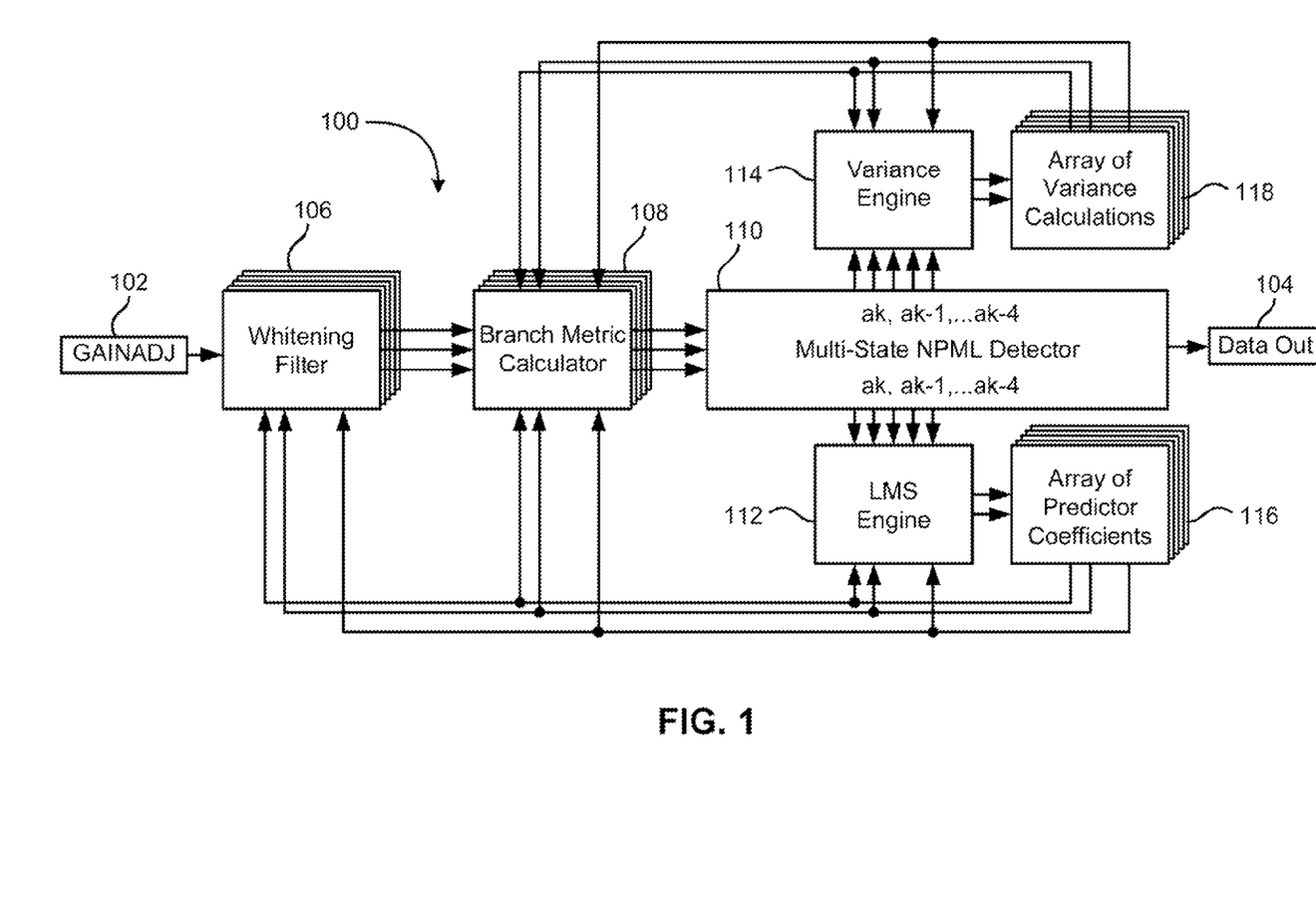
FIG. 1 is a block diagram of a multi-state Adaptive DD-NPML detector, according to one embodiment.

In FIG. 1, a block diagram of a multi-state Adaptive DD-NPML detector 100 is shown, according to one embodiment. One primary input to the system, GAINADJ 102, is a sequence of digitized samples from the magnetic data channel, such as a magnetic tape channel, which is synchronized and gain-adjusted, according to one approach. The output of the system, Data Out 104, is a binary data associated with the input sequence. Several of the blocks are described in detail in additional figures, starting with the Whitening Filter 106 and proceeding in a clockwise manner.

As shown in FIG. 1, a multi-state Adaptive DD-NPML detector 100 may preferably use five primary blocks, according to one approach. Of course, more or less blocks are also possible, depending on the amount of processing desired for the input signal. Also, some blocks may be used multiple times, as indicated in FIG. 1 as a stack of blocks (e.g., the Whitening Filter 106, Branch Metric Calculator 108, etc.). One embodiment of a multi-state Adaptive DD-NPML detector 100 is a 16-state Adaptive DD-NPML detector. In this example, according to a preferred embodiment, the 16-state Adaptive DD-NPML detector may use a single 16-State NPML Detector 110, 32 copies of a two-tap Whitening Filter 106, 32 copies of a Branch Metric Calculator 108, a single LMS Engine 112 to calculate an array of 64 Predictor Coefficients 116, (e.g., 32 sets of a first predictor coefficient (W1) and 32 sets of a second predictor coefficient (W2)), and a single Variance Engine 114 to calculate an array of 64 Variance Calculations 118 (e.g., 32 sets of $1/\sigma^2$ coefficients and 32 sets of ln [$\sigma^2$] coefficients). Of course, other configurations are also possible, such as an 8-state Adaptive DD-NPML detector, a 32-state Adaptive DD-NPML detector, a 4-state Adaptive DD-NPML detector, etc. Each of these configurations may also use multiple blocks, possibly in numbers different from those described in the example above. In one embodiment, the number of multiple blocks (e.g., the Whitening Filter 106, Branch Metric Calculator 108, etc.) used may be twice the number of states of the multi-state NPML detector.

For the remainder of the descriptions provided herein, it is assumed that a 16-state Adaptive DD-NPML detector is being described, and the number of components thereof are selected based on using a 16-state NPML detector. This, however, is not meant to be limiting on the scope of the present invention in any manner.

Figure 2:
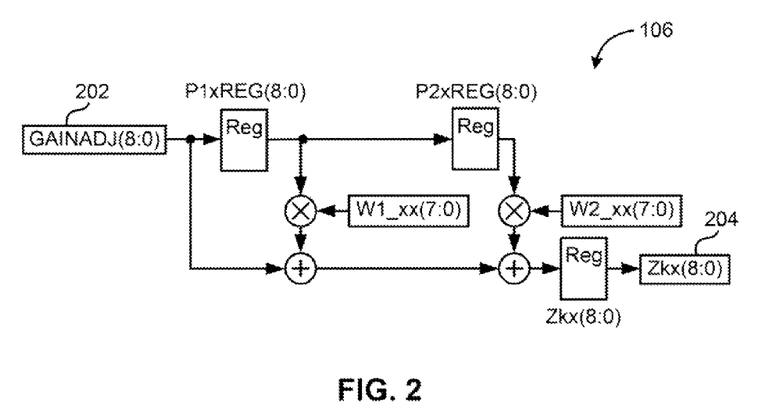
FIG. 2 is a block diagram of a Whitening Filter, according to one embodiment.

A block diagram of a Whitening Filter 106 is shown in FIG. 2, according to one embodiment. For 16-state DD-NPML, there are 32 Whitening Filters 106, e.g., 32 copies of the Whitening Filter 106 shown in FIG. 2. The input to the Whitening Filter 106 is GAINADJ(8:0) 202, which in some approaches may be a 9-bit word. GAINADJ(8:0) 202 represents a sequence of digitized samples from the magnetic data channel that, in one approach, has been equalized to a PR4 target, "synchronized" with bit locations, and has been gain adjusted. The Whitening Filter 106 may be a finite impulse response (FIR) filter with two programmable 8-bit taps: P1x and P2x. For simplicity, the remaining description will assume that the Whitening Filter 106 has 8-bit taps P1x and P2x. Also, according to some approaches, the output Zkx(8:0) 204 may be a 9-bit word, the same size as the input GAINADJ (8:0) 202.

According to preferred embodiments, the calculation implemented by the Whitening Filter 106 is represented by Equation 1, below:

$$z_k = y_k - p_1(\underline{a}) y_{k-1} - p_2(\underline{a}) y_{k-2} \qquad \text{Equation 1}$$

where $z_k$ is the filtered sequence, $y_k$ is the input stream (shown in FIG. 2 as GAINADJ(8:0)), $p_1(\underline{a})$ is a first programmable 8-bit function of a binary sequence from the input stream (shown in FIG. 2 as W1_xx(7:0)), and $p_2(\underline{a})$ is a second programmable 8-bit function of a binary sequence from the input stream (shown in FIG. 2 as W2_xx(7:0)). According to some approaches, a numeric representation of the data may include GAINADJ(8:0) being a 9-bit number where $-4.0 \leq$ GAINADJ(8:0) $\leq +4.0$. Also, the filtered sequence, Zkx (8:0), may be a 9-bit number where $-8.0 \leq$ Zkx(8:0) $\leq +8.0$.

Figure 3:
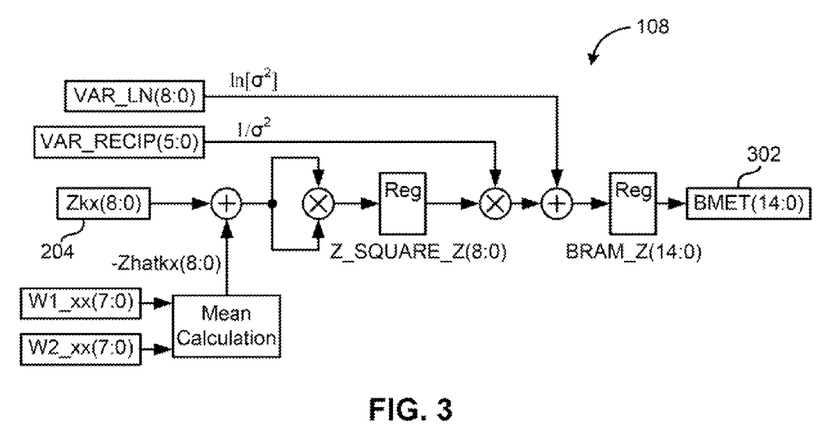
FIG. 3 is a block diagram of a Branch Metric Calculator, according to one embodiment.

A block diagram of a Branch Metric Calculator 108, according to one embodiment, is shown in FIG. 3. For DD-NPML, there are 32 of the Branch Metric Calculators, two for each state, e.g., 32 copies of the Branch Metric Calculator 108 shown in FIG. 3. The calculation implemented by the Branch Metric Calculator 108, according to one preferred embodiment, is shown in Equation 2, below:

$$m_k = \ln(\sigma^2(\underline{a})) + \frac{[z_k - \hat{z}_k(\underline{a})]^2}{\sigma^2(\underline{a})} \qquad \text{Equation 2}$$

where $m_k$ is the branch metric, $\sigma^2(\underline{a})$ is the error-variance of the binary sequence from the input stream, $z_k$ is the filtered sequence, and $\hat{z}_k(\underline{a})$ is a mean calculation of all binary sequences from the input stream. In FIG. 3, according to some approaches, the Branch Metric Calculator 108 may have several inputs. Zkx(8:0) 204 is an input that is received from the Whitening Filter (FIG. 2, 106). Those inputs which have not been described previously include a mean calculation of what is expected to be received based on the original input stream, GAINADJ(8:0), from the two programmable 8-bit taps, P1x and P2x, and what is actually received from the Whitening Filter 106, Zkx(8:0). This variable is indicated as Zhatkx(8:0), which may be a 9-bit number where $-8.0 \leq$ Zhatkx(8:0) $\leq +8.0$. The error calculation between zkx(8:0) and zhatkx(8:0), $z_k - \hat{z}_k(\underline{a})$, may be a 10-bit number where $-16.0 \leq z_k - \hat{z}_k(\underline{a}) \leq +15.969$; the absolute value $|z_k - \hat{z}_k(\underline{a})|$ may take the magnitude of the error and quantize to 7-bits where $0 \leq |z_k - \hat{z}_k(\underline{a})| \leq 3.969$; and the square of the error calculation, $[z_k - \hat{z}_k(\underline{a})]^2$, may be a 14-bit number where $0.0 \leq [z_k - \hat{z}_k(\underline{a})]^2 \leq +15.751$. Furthermore, in some approaches, $[z_k - \hat{z}_k(\underline{a})]^2$ may be quantized back to a 9-bit word where $0.0 \leq [z_k - \hat{z}_k(\underline{a})]^2 \leq +15.75$ (note that in order to meet timing requirement, the intermediate calculation $[z_k - \hat{z}_k(\underline{a})]^2$ is stored in a register—called Z_SQUARE_Z(8:0) as shown in FIG. 3). In some approaches, the inverse square of the variance, $1/\sigma^2$, indicated by VAR_RECIP(5:0) in FIG. 3, may be represented by a 6-bit positive number where $1 \leq 1/\sigma^2 \leq 63$. To continue the calculation, $$[z_k - \hat{z}_k(a)]^2 \times \frac{1}{\sigma^2}$$

is calculated to produce a 15-bit number where 0x20(32 d)=1 d, $$0 \leq [z_k - \hat{z}_k(a)] \times \frac{1}{\sigma^2} \leq 31752,$$

$$0 \leq \frac{[z_k - \hat{z}_k(a)]^2}{\sigma^2} \leq 992.25.$$

Then, the negative log of the squared variance, $-\ln(\sigma^2)$, represented by VAR_LN(8:0) in FIG. 3, may be represented by an 8-bit positive number where $0.03125 \leq -\ln(\sigma^2) \leq 7.969$ d. If $-\ln(\sigma^2)$ is added to $$\frac{[z_k - \hat{z}_k(a)]^2}{\sigma^2}:,$$

then $$\frac{[z_k - \hat{z}_k(a)]^2}{\sigma^2} + \ln(\sigma^2):,$$

$$0 \leq \frac{[z_k - \hat{z}_k(a)]^2}{\sigma^2} + \ln(\sigma^2) \leq 1000.2 d$$

is the branch metric BMET(14:0) 302 output from the Branch Metric Calculator 108 (note that in order to meet timing requirements, the Branch Metric Calculator 108 is stored in a register—called BRAM_Z(14:0)—before being output to the multi-state NPML detector.

A generic 4th order maximum-likelihood (ML) detector that is used in the 16-state adaptive DD-NPML detector (110, FIG. 1) is shown below, according to one embodiment. The log likelihood function description below is part of the mathematical development of the equations and is not directly relevant to the hardware implementation, although in some embodiments, it may be used.

Log Likelihood Functions $m_k(0)$=maximum$\{m_{k-1}(0)+\ln[p(z_k|s_k=0;a_k=0)];m_{k-1}(1)+\ln[p(z_k|s_k=1;a_k=0)]\}$ $m_k(1)$=maximum$\{m_{k-1}(2)+\ln[p(z_k|s_k=2;a_k=0)];m_{k-1}(3)+\ln[p(z_k|s_k=3;a_k=0)]\}$ $m_k(2)$=maximum$\{m_{k-1}(4)+\ln[p(z_k|s_k=4;a_k=0)];m_{k-1}(5)+\ln[p(z_k|s_k=5;a_k=0)]\}$ $m_k(3)$=maximum$\{m_{k-1}(6)+\ln[p(z_k|s_k=6;a_k=0)];m_{k-1}(7)+\ln[p(z_k|s_k=7;a_k=0)]\}$ $m_k(4)$=maximum$\{m_{k-1}(8)+\ln[p(z_k|s_k=8;a_k=0)];m_{k-1}(9)+\ln[p(z_k|s_k=9;a_k=0)]\}$ $m_k(5)$=maximum$\{m_{k-1}(10)+\ln[p(z_k|s_k=10;a_k=0)];m_{k-1}(11)+\ln[p(z_k|s_k=11;a_k=0)]\}$ $m_k(6)$=maximum$\{m_{k-1}(12)+\ln[p(z_k|s_k=12;a_k=0)];m_{k-1}(13)+\ln[p(z_k|s_k=13;a_k=0)]\}$ $m_k(7)$=maximum$\{m_{k-1}(14)+\ln[p(z_k|s_k=14;a_k=0)];m_{k-1}(15)+\ln[p(z_k|s_k=15;a_k=0)]\}$ $m_k(8)$=maximum$\{m_{k-1}(0)+\ln[p(z_k|s_k=0;a_k=1)];m_{k-1}(1)+\ln[p(z_k|s_k=1;a_k=1)]\}$ $m_k(9)$=maximum$\{m_{k-1}(2)+\ln[p(z_k|s_k=2;a_k=1)];m_{k-1}(3)+\ln[p(z_k|s_k=3;a_k=1)]\}$ $m_k(10)$=maximum$\{m_{k-1}(4)+\ln[p(z_k|s_k=4;a_k=1)];m_{k-1}(5)+\ln[p(z_k|s_k=5;a_k=1)]\}$ $m_k(11)$=maximum$\{m_{k-1}(6)+\ln[p(z_k|s_k=6;a_k=1)];m_{k-1}(7)+\ln[p(z_k|s_k=7;a_k=1)]\}$ $m_k(12)$=maximum$\{m_{k-1}(8)+\ln[p(z_k|s_k=8;a_k=1)];m_{k-1}(9)+\ln[p(z_k|s_k=9;a_k=1)]\}$ $m_k(13)$=maximum$\{m_{k-1}(10)+\ln[p(z_k|s_k=10;a_k=1)];m_{k-1}(11)+\ln[p(z_k|s_k=11;a_k=1)]\}$ $m_k(14)$=maximum$\{m_{k-1}(12)+\ln[p(z_k|s_k=12;a_k=1)];m_{k-1}(13)+\ln[p(z_k|s_k=13;a_k=1)]\}$ $m_k(15)$=maximum$\{m_{k-1}(14)+\ln[p(z_k|s_k=14;a_k=1)];m_{k-1}(15)+\ln[p(z_k|s_k=15;a_k=1)]\}$ The metric calculations shown below may be implemented in hardware, according to one embodiment. Note that the Branch Metric Calculator 108 may be identified twice within each metric calculation.

Metric Calculations $$m_k(0) = \text{minimum}\left\{m_{k-1}(0) + \ln(\sigma_{0/0}^2) + \frac{[z_k - \hat{z}_{k-0/0}]^2}{\sigma_{0/0}^2}; \right.$$
$$\left. m_{k-1}(1) + \ln(\sigma_{1/0}^2) + \frac{[z_k - \hat{z}_{k-1/0}]^2}{\sigma_{1/0}^2}\right\}$$

$$m_k(1) = \text{minimum}\left\{m_{k-1}(2) + \ln(\sigma_{2/0}^2) + \frac{[z_k - \hat{z}_{k-2/0}]^2}{\sigma_{2/0}^2}; \right.$$
$$\left. m_{k-1}(3) + \ln(\sigma_{3/0}^2) + \frac{[z_k - \hat{z}_{k-3/0}]^2}{\sigma_{3/0}^2}\right\}$$

$$m_k(2) = \text{minimum}\left\{m_{k-1}(4) + \ln(\sigma_{4/0}^2) + \frac{[z_k - \hat{z}_{k-4/0}]^2}{\sigma_{4/0}^2}; \right.$$
$$\left. m_{k-1}(5) + \ln(\sigma_{5/0}^2) + \frac{[z_k - \hat{z}_{k-5/0}]^2}{\sigma_{5/0}^2}\right\}$$

$$m_k(3) = \text{minimum}\left\{m_{k-1}(6) + \ln(\sigma_{6/0}^2) + \frac{[z_k - \hat{z}_{k-6/0}]^2}{\sigma_{6/0}^2}; \right.$$
$$\left. m_{k-1}(7) + \ln(\sigma_{7/0}^2) + \frac{[z_k - \hat{z}_{k-7/0}]^2}{\sigma_{7/0}^2}\right\}$$

$$m_k(4) = \text{minimum}\left\{m_{k-1}(8) + \ln(\sigma_{8/0}^2) + \frac{[z_k - \hat{z}_{k-8/0}]^2}{\sigma_{8/0}^2}; \right.$$
$$\left. m_{k-1}(9) + \ln(\sigma_{9/0}^2) + \frac{[z_k - \hat{z}_{k-9/0}]^2}{\sigma_{9/0}^2}\right\}$$

$$m_k(5) = \text{minimum}\left\{m_{k-1}(10) + \ln(\sigma_{10/0}^2) + \frac{[z_k - \hat{z}_{k-10/0}]^2}{\sigma_{10/0}^2}; \right.$$
$$\left. m_{k-1}(11) + \ln(\sigma_{11/0}^2) + \frac{[z_k - \hat{z}_{k-11/0}]^2}{\sigma_{11/0}^2}\right\}$$

$$m_k(6) = \text{minimum}\left\{m_{k-1}(12) + \ln(\sigma_{12/0}^2) + \frac{[z_k - \hat{z}_{k-12/0}]^2}{\sigma_{12/0}^2};\right.$$

$$\left. m_{k-1}(13) + \ln(\sigma_{13/0}^2) + \frac{[z_k - \hat{z}_{k-13/0}]^2}{\sigma_{13/0}^2}\right\}$$

$$m_k(7) = \text{minimum}\left\{m_{k-1}(14) + \ln(\sigma_{14/0}^2) + \frac{[z_k - \hat{z}_{k-14/0}]^2}{\sigma_{14/0}^2};\right.$$

$$\left. m_{k-1}(15) + \ln(\sigma_{15/0}^2) + \frac{[z_k - \hat{z}_{k-15/0}]^2}{\sigma_{15/0}^2}\right\}$$

$$m_k(8) = \text{minimum}\left\{m_{k-1}(0) + \ln(\sigma_{0/1}^2) + \frac{[z_k - \hat{z}_{k-0/1}]^2}{\sigma_{0/1}^2};\right.$$

$$\left. m_{k-1}(1) + \ln(\sigma_{1/1}^2) + \frac{[z_k - \hat{z}_{k-1/1}]^2}{\sigma_{1/1}^2}\right\}$$

$$m_k(9) = \text{minimum}\left\{m_{k-1}(2) + \ln(\sigma_{2/1}^2) + \frac{[z_k - \hat{z}_{k-2/1}]^2}{\sigma_{2/1}^2};\right.$$

$$\left. m_{k-1}(3) + \ln(\sigma_{3/1}^2) + \frac{[z_k - \hat{z}_{k-3/1}]^2}{\sigma_{3/1}^2}\right\}$$

$$m_k(10) = \text{minimum}\left\{m_{k-1}(4) + \ln(\sigma_{4/1}^2) + \frac{[z_k - \hat{z}_{k-4/1}]^2}{\sigma_{4/1}^2};\right.$$

$$\left. m_{k-1}(5) + \ln(\sigma_{5/1}^2) + \frac{[z_k - \hat{z}_{k-5/1}]^2}{\sigma_{5/1}^2}\right\}$$

$$m_k(11) = \text{minimum}\left\{m_{k-1}(6) + \ln(\sigma_{6/1}^2) + \frac{[z_k - \hat{z}_{k-6/1}]^2}{\sigma_{6/1}^2};\right.$$

$$\left. m_{k-1}(7) + \ln(\sigma_{7/1}^2) + \frac{[z_k - \hat{z}_{k-7/1}]^2}{\sigma_{7/1}^2}\right\}$$

$$m_k(12) = \text{minimum}\left\{m_{k-1}(8) + \ln(\sigma_{8/1}^2) + \frac{[z_k - \hat{z}_{k-8/1}]^2}{\sigma_{8/1}^2};\right.$$

$$\left. m_{k-1}(9) + \ln(\sigma_{9/1}^2) + \frac{[z_k - \hat{z}_{k-9/1}]^2}{\sigma_{9/1}^2}\right\}$$

$$m_k(13) = \text{minimum}\left\{m_{k-1}(10) + \ln(\sigma_{10/1}^2) + \frac{[z_k - \hat{z}_{k-10/1}]^2}{\sigma_{10/1}^2};\right.$$

$$\left. m_{k-1}(11) + \ln(\sigma_{11/1}^2) + \frac{[z_k - \hat{z}_{k-11/1}]^2}{\sigma_{11/1}^2}\right\}$$

$$m_k(14) = \text{minimum}\left\{m_{k-1}(12) + \ln(\sigma_{12/1}^2) + \frac{[z_k - \hat{z}_{k-12/1}]^2}{\sigma_{12/1}^2};\right.$$

$$\left. m_{k-1}(13) + \ln(\sigma_{13/1}^2) + \frac{[z_k - \hat{z}_{k-13/1}]^2}{\sigma_{13/1}^2}\right\}$$

$$m_k(15) = \text{minimum}\left\{m_{k-1}(14) + \ln(\sigma_{14/1}^2) + \frac{[z_k - \hat{z}_{k-14/1}]^2}{\sigma_{14/1}^2};\right.$$

$$\left. m_{k-1}(15) + \ln(\sigma_{15/1}^2) + \frac{[z_k - \hat{z}_{k-15/1}]^2}{\sigma_{15/1}^2}\right\}$$

With 16-state adaptive DD-NPML, there may be 32 mean parameters based upon combinations of the five h-coefficients from 32 sets of predictor coefficients, in some approaches, e.g., $(1-D^2)(1-P_{1x}D-P_{2x}D^2) = h_{0x} + h_{1x}D + h_{2x}D^2 + h_{3x}D^3 + h_{4x}D^4$, where $h_{0x} = 1$, $h_{1x} = -P_{1x}$, $h_{2x} = -(1 + P_{2x})$, $h_{3x} = P_{1x}$, and $h_{4x} = P_{2x}$, as shown in Table 1, according to one embodiment.

TABLE 1

| Mean Parameters | |
| --- | --- |
| $\hat{z}_{k-0/0} = 0$ | $\hat{z}_{k-0/1} = h_0 = 1$ |
| $\hat{z}_{k-1/0} = h_4 = P_{2-1/0}$ | $\hat{z}_{k-1/1} = h_0 + h_4 = 1 + P_{2-1/1}$ |
| $\hat{z}_{k-2/0} = h_3 = P_{1-2/0}$ | $\hat{z}_{k-2/1} = h_0 + h_3 = 1 + P_{1-2/1}$ |
| $\hat{z}_{k-3/0} = h_3 + h_4 = P_{1-3/0} + P_{2-3/0}$ | $\hat{z}_{k-3/1} = h_0 + h_3 + h_4 = 1 + P_{1-3/1} + P_{2-3/1}$ |
| $\hat{z}_{k-4/0} = h_2 = -(1 + P_{2-4/0})$ | $\hat{z}_{k-4/1} = h_0 + h_2 = -P_{2-4/1}$ |
| $\hat{z}_{k-5/0} = h_2 + h_4 = -1$ | $\hat{z}_{k-5/1} = h_0 + h_2 + h_4 = 0$ |
| $\hat{z}_{k-6/0} = h_2 + h_3 =$ $P_{1-6/0} - (1 + P_{2-6/0})$ | $\hat{z}_{k-6/1} = h_0 + h_2 + h_3 = P_{1-6/1} - P_{2-6/1}$ |
| $\hat{z}_{k-7/0} = h_2 + h_3 + h_4 = P_{1-7/0} - 1$ | $\hat{z}_{k-7/1} = h_0 + h_2 + h_3 + h_4 = P_{1-7/1}$ |
| $\hat{z}_{k-8/0} = h_1 = -P_{1-8/0}$ | $\hat{z}_{k-8/1} = h_0 + h_1 = 1 - P_{1-8/1}$ |
| $\hat{z}_{k-9/0} = h_1 + h_4 = P_{2-9/0} - P_{1-9/0}$ | $\hat{z}_{k-9/1} = h_0 + h_1 + h_4 = 1 + P_{2-9/1} - P_{1-9/1}$ |
| $\hat{z}_{k-10/0} = h_1 + h_3 = 0$ | $\hat{z}_{k-10/1} = h_0 + h_1 + h_3 = 1$ |
| $\hat{z}_{k-11/0} = h_1 + h_3 + h_4 = P_{2-11/0}$ | $\hat{z}_{k-11/1} = h_0 + h_1 + h_3 + h_4 = 1 + P_{2-11/1}$ |
| $\hat{z}_{k-12/0} = h_1 + h_2 =$ $-(P_{1-12/0} + P_{2-12/0} + 1)$ | $\hat{z}_{k-12/1} = h_0 + h_1 + h_2 =$ $-(P_{1-12/1} + P_{2-12/1})$ |
| $\hat{z}_{k-13/0} = h_1 + h_2 + h_4 =$ $-(P_{1-13/0} + 1)$ | $\hat{z}_{k-13/1} = h_0 + h_1 + h_2 + h_4 = -P_{1-13/1}$ |
| $\hat{z}_{k-14/0} = h_1 + h_2 + h_3 =$ $-(P_{2-14/0} + 1)$ | $\hat{z}_{k-14/1} = h_0 + h_1 + h_2 + h_3 = -P_{2-14/1}$ |
| $\hat{z}_{k-15/0} = h_1 + h_2 + h_3 + h_4 = -1$ | $\hat{z}_{k-15/1} = h_0 + h_1 + h_2 + h_3 + h_4 = 0$ |

Figure 4:
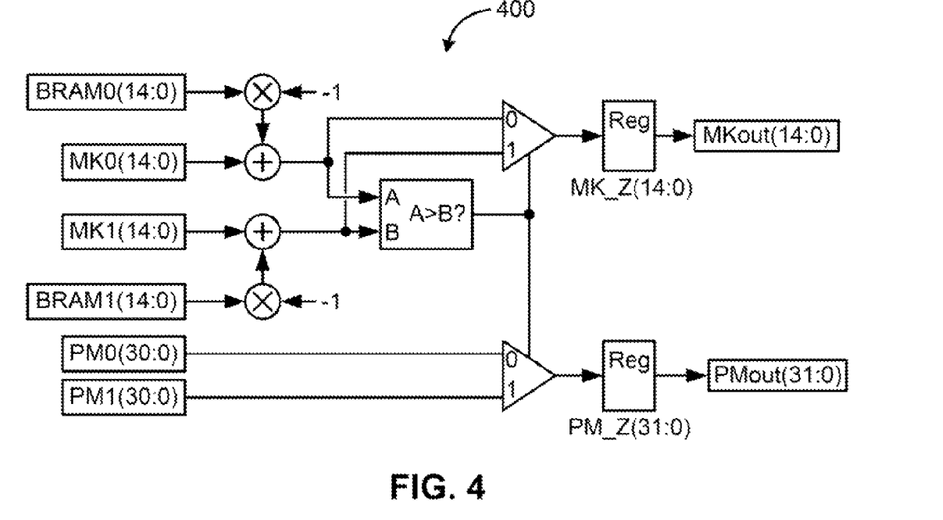
FIG. 4 shows a block diagram of compare and select logic, according to one embodiment.

According to some approaches, compare and select logic may be programmed to determine solutions in a desired way. In one such approach, the compare and select logic 400 may be represented by the block diagram shown in FIG. 4. The compare and select logic 400 includes various inputs, BRAM0(14:0), BRAM1(14:0), MK0(14:0), MK1(14:0), PM0(30:0), and PM1(30:0), along with two outputs, MKout (14:0) and PMout(31:0). For a 16-state maximum-likelihood detector, there are 16 copies of the compare select logic 400. MK0(14:0), MK1(14:0), and MKout(14:0) are the path metric calculations as described in the table of equations entitled "Metric Calculations." PM0(30:0), and PM1(30:0), and PMout(31:0) are the path memories. The path memories contain the detected sequence of binary data associated with each state.

Figure 5:
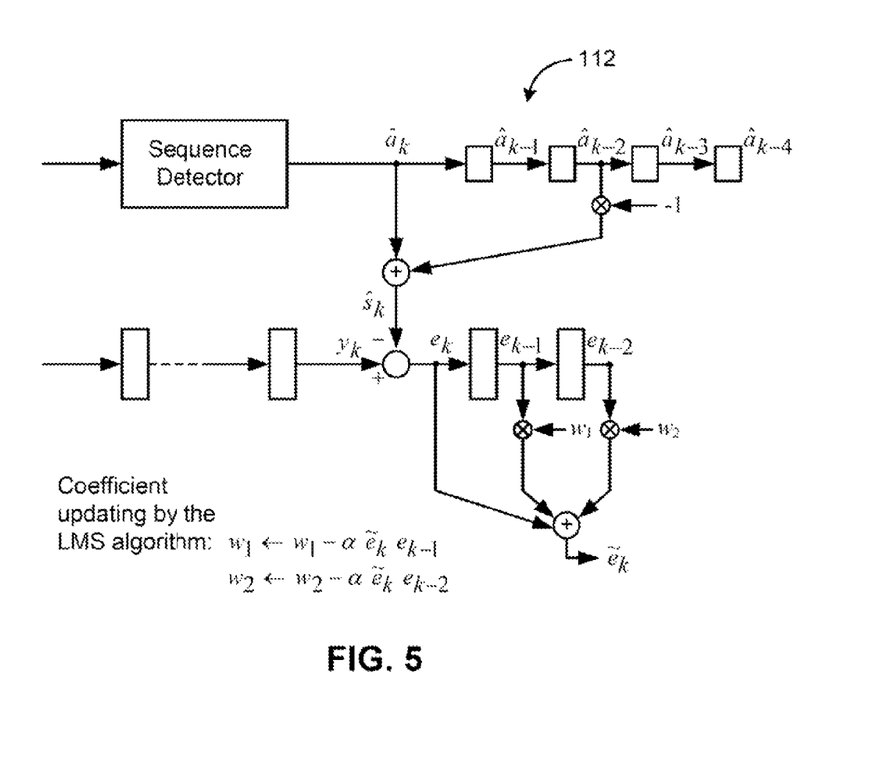
FIG. 5 shows a generalized diagram of an LMS Engine, according to one embodiment.

Now referring to FIG. 5, a generalized diagram of an LMS Engine 112 is shown according to one embodiment. The binary sequence ($\hat{a}_k$, $\hat{a}_{k-1}$, ... $\hat{a}_{k-4}$) may be derived from the path memories or path metrics of the detector, in some approaches. From the binary sequence, the expected PR4 samples may be derived and compared to the received PR4 samples to derive an error signal $e_k$. In one approach, the error signal is filtered through a FIR filter that matches the Whitening Filter 106 architecture producing an output $\tilde{e}_k$. The filter output $\tilde{e}_k$ is input into two LMS taps, in one approach, to generate $w_1$ and $w_2$, which are sometimes referred to as W1 and W2, which are fed back to the FIR filter. Since at any one time, there is only one sequence ($\hat{a}_k$, $\hat{a}_{k-1}$, ... $\hat{a}_{k-4}$) being output from the detector, there is only one set of $w_1$ and $w_2$ coefficients out of 32 that is updated at any one point in time. Thus, with appropriate control, a single set of LMS hardware can be used to update all 32 sets of $w_1$ and $w_2$ coefficients. The input sequence ($\hat{a}_k$, $\hat{a}_{k-1}$, ... $\hat{a}_{k-4}$) may be used to select the correct set of $w_1$ and $w_2$ coefficients for multiplexing into and out of the LMS Engine 112 and an array of registers can be used to store 32 $w_1$ and $w_2$ coefficients, as shown in FIG. 6.

Figure 6:
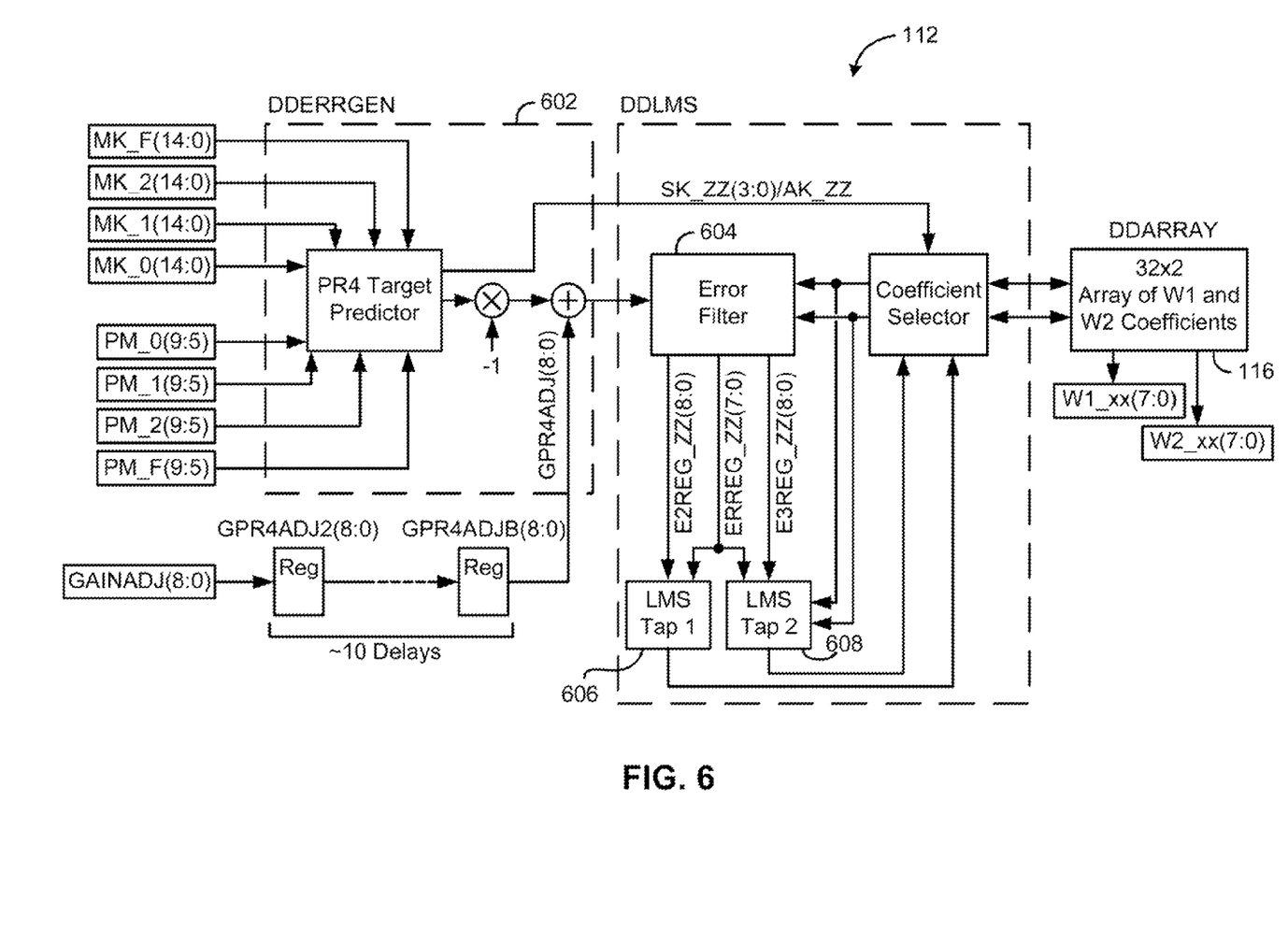
FIG. 6 shows a hardware architecture of an LMS Engine, according to one embodiment.

Now referring to FIG. 6, a hardware architecture of a LMS Engine 112 is shown according to one embodiment, based upon FIG. 5. Of course, other hardware implementations may be used, and the configuration shown in FIG. 6 is illustrative only, and not meant to be limiting in any way. There are three main components to the hardware LMS Engine 112, in one approach: determining the PR4 target signal and generation of the PR4 error 602; the error filter 604; and the two LMS taps 606, 608. Inputs to the LMS Engine 112 include path metrics MK_F(14:0), MK_2(14:0), MK_1(14:0), MK_0

(14:0); path memories PM_F(9:5), PM__2(9:5), PM__1(9:5), PM__0(9:5), and GAINADJ(8:0)—the primary input to the system. Outputs include the DDARRAY, which, for a 16-satate DD-NPML detector, includes 32 W1 coefficients and 32 W2 coefficients, which are output as W1_xx(7:0) and W2_xx(7:0). To correctly generate the error signal, the input, GAINADJ(8:0), must be correctly aligned with the reconstructed PR4 signal estimate at the output of the "PR4 Target Predictor" block. This is done with the sequence of registers labeled GPR4ADJ2(8:0), GPR4ADJ3(8:0) . . . GPR4ADJB (8:0).

Figure 7:
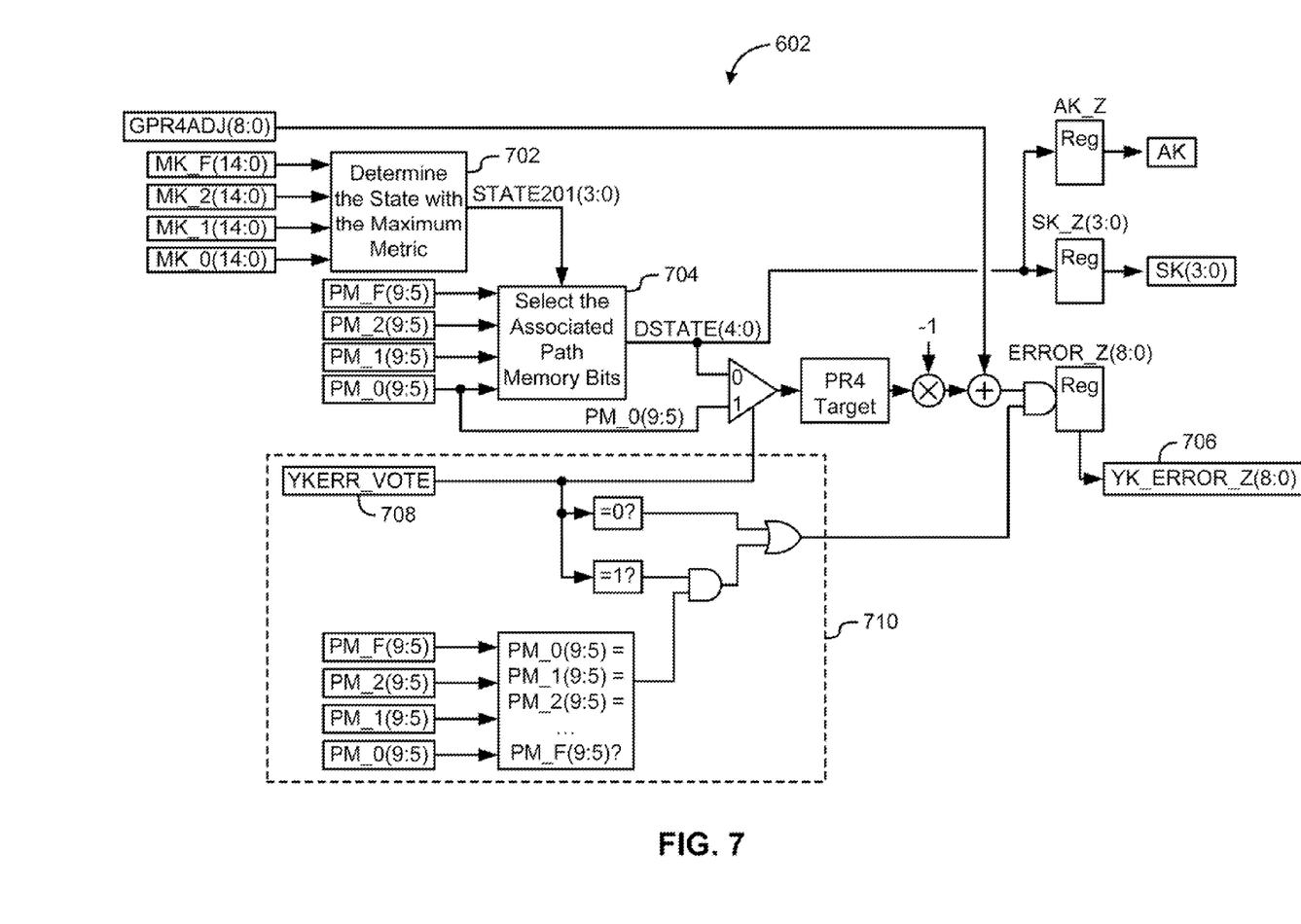
FIG. 7 shows a block diagram of PR4 target and error generation, according to one embodiment.

Now referring to FIG. 7, PR4 target and error generation 602 is described according to one embodiment. The logic associated with this block determines the error between the expected PR4 signal and the received PR4 signal. According to one embodiment, this process begins with determining the state with the largest metric 702, e.g., the state that most-likely contains the correct binary sequence. This logic comprises primarily a sequence of metric comparisons, comparing metrics two at a time and saving the largest metric and the associated state. Once the state that has the largest metric is identified, STATE201(3:0), then the path metric is selected for that given state 704. According to one approach, each path memory may be 32 bits in length and bits five through nine may be used as estimates of $\hat{a}_k, \hat{a}_{k-1}, \ldots \hat{a}_{k-4}$. With the path memory bits, the ideal PR4 signal is reconstructed and the difference between the ideal PR4 signal and the received PR4 signal is calculated, YK_ERROR_Z(8:0) 706, which represents a variance. According to one approach, YK_ERROR_Z (8:0), may be a 9-bit number where $-4.0 \leq$ YK_ERROR_Z $(8:0) \leq +4.0$ d. There are several other outputs from the PR4 target and error generation 602, including AK and SK(3:0). AK and SK(3:0) are signals derived from the binary sequence estimate $\hat{a}_k, \hat{a}_{k-1}, \ldots \hat{a}_{k-4}$. $SK(3) = \hat{a}_{k-3}, SK(2) = \hat{a}_{k-2}, SK(1) = \hat{a}_{k-1}$, $SK(0) = \hat{a}_k$, and $AK = \hat{a}_{k-4}$. SK_Z(3:0) and AK_Z are versions of SK(3:0) and AK that are delayed by a set of registers so that they are correctly aligned in time with the error signal (YK_ERROR_Z(8:0) 706) that is generated at the output of error generator 602.

An additional qualifying circuit 710 may be included to help prevent false sequences from corrupting the error signal, controllable through YKERR_VOTE 708. The circuit 710 may be enabled by setting YKERR_VOTE=1, according to one embodiment, which causes an error to be generated only when all the $\hat{a}_k, \hat{a}_{k-1}, \ldots \hat{a}_{k-4}$ sequence from each of the path memories is identical, e.g., there is unanimous agreement between the path memories on what the received signal is.

Figure 8:
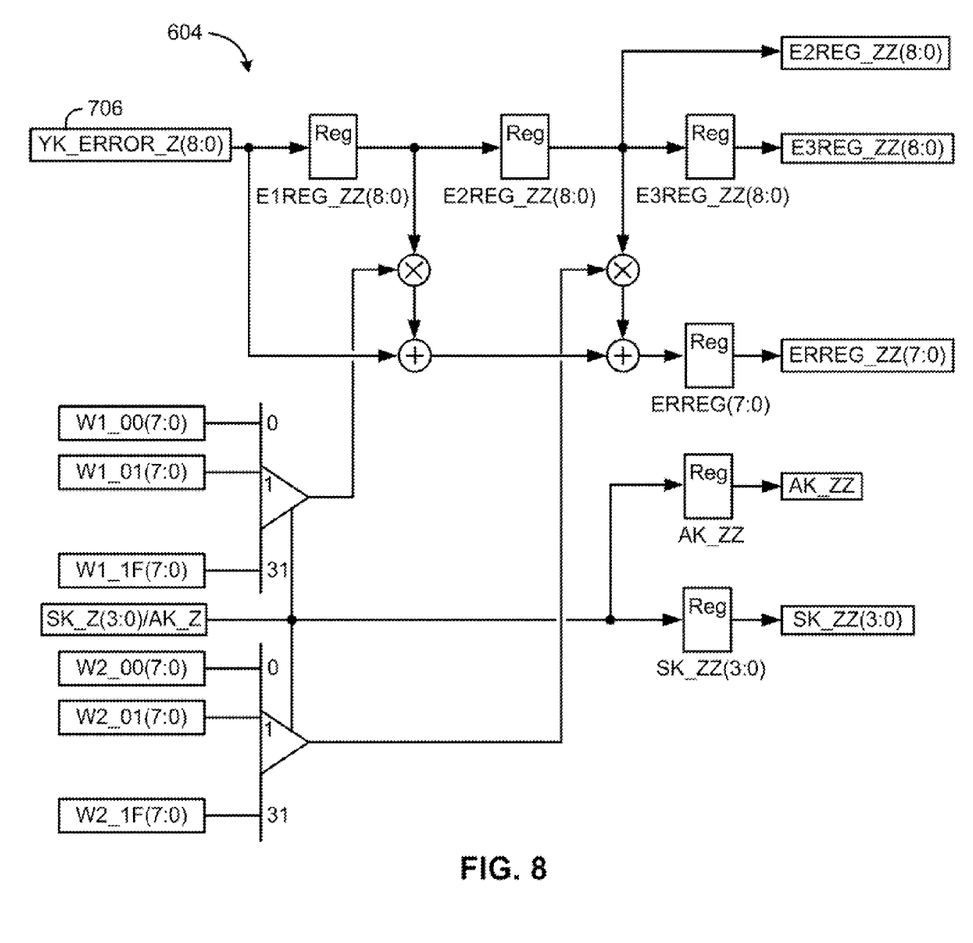
FIG. 8 shows a block diagram of an error filter, according to one embodiment.

Referring to FIG. 8, the error filter 604, in one embodiment, may be very similar to the Whitening. Filter 106. Architecturally, one difference is the additional set of registers at the output, ERREG(7:0), AK_ZZ, and SK_ZZ(3:0). Also, the W1x (W1__00(7:0), W1__01(7:0), . . . W1__1F(7:0)) and W2x (W2__00(7:0), W2__01(7:0), . . . W2__1F(7:0)) coefficients are dynamically selected from a bank of 32 sets of coefficients (an array of 64 coefficients total). The timing of the arrival of W1x and W2x is coincident with the predicted error input YK_ERROR_Z(8:0) 706. In FIG. 8, there are several inputs and outputs shown. Those which have not been described previously include E2REG_ZZ(8:0), which may be a 9-bit number where $-4.0 \leq$ E2REG_ZZ(8:0) $\leq +4.0$ d. Also, in some approaches, E3REG_ZZ(8:0) may be a 9-bit number where $-4.0 \leq$ E3REG_ZZ(8:0) $\leq +4.0$ d. In addition, ERREG_ZZ(7:0) may be an 8-bit number where $-4.0 \leq$ ERREG_ZZ(8:0) $\leq +4.0$ d.

Figure 9A:
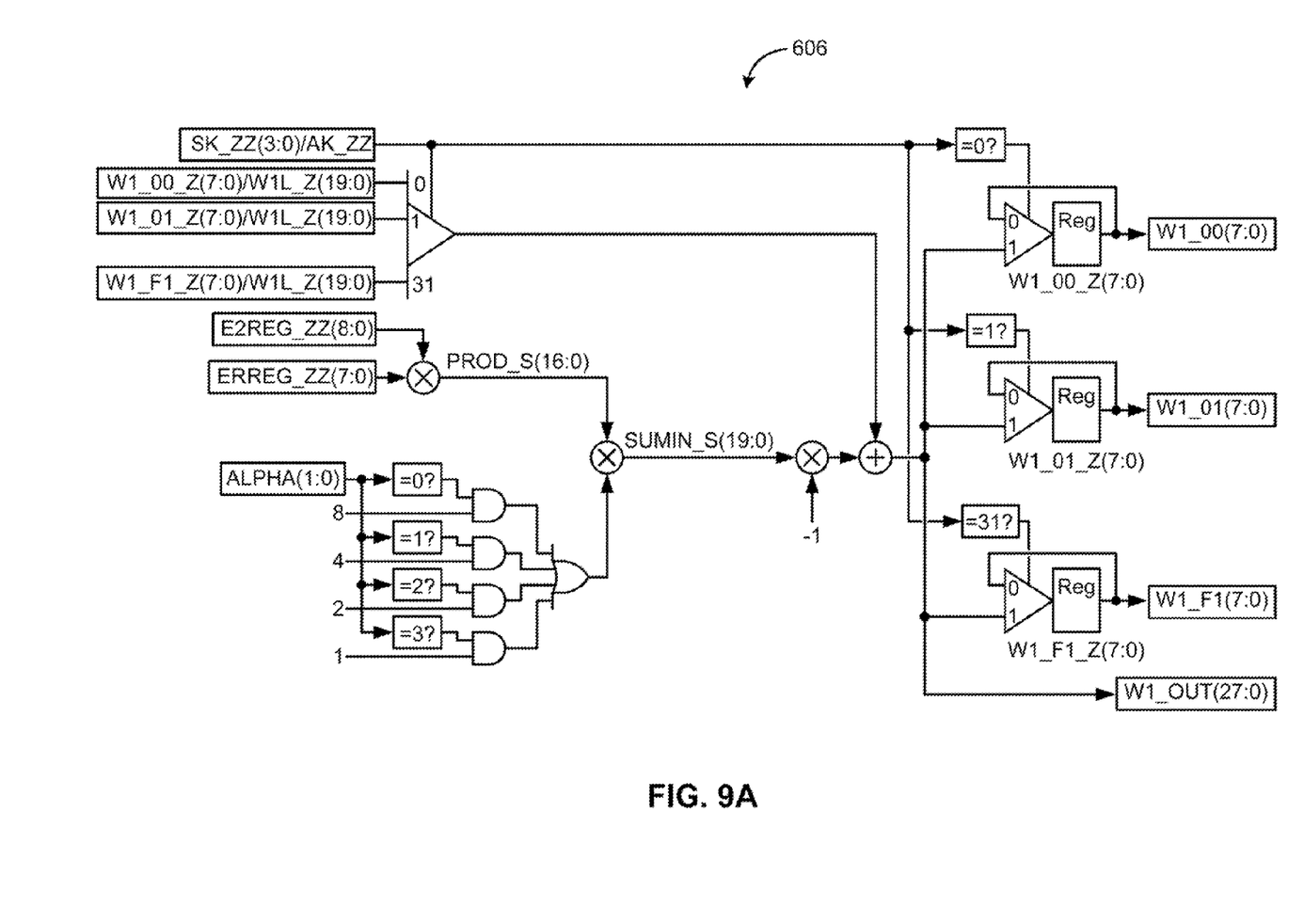
FIGS. 9A-9B show two LMS taps, according to one embodiment.
Figure 9B:
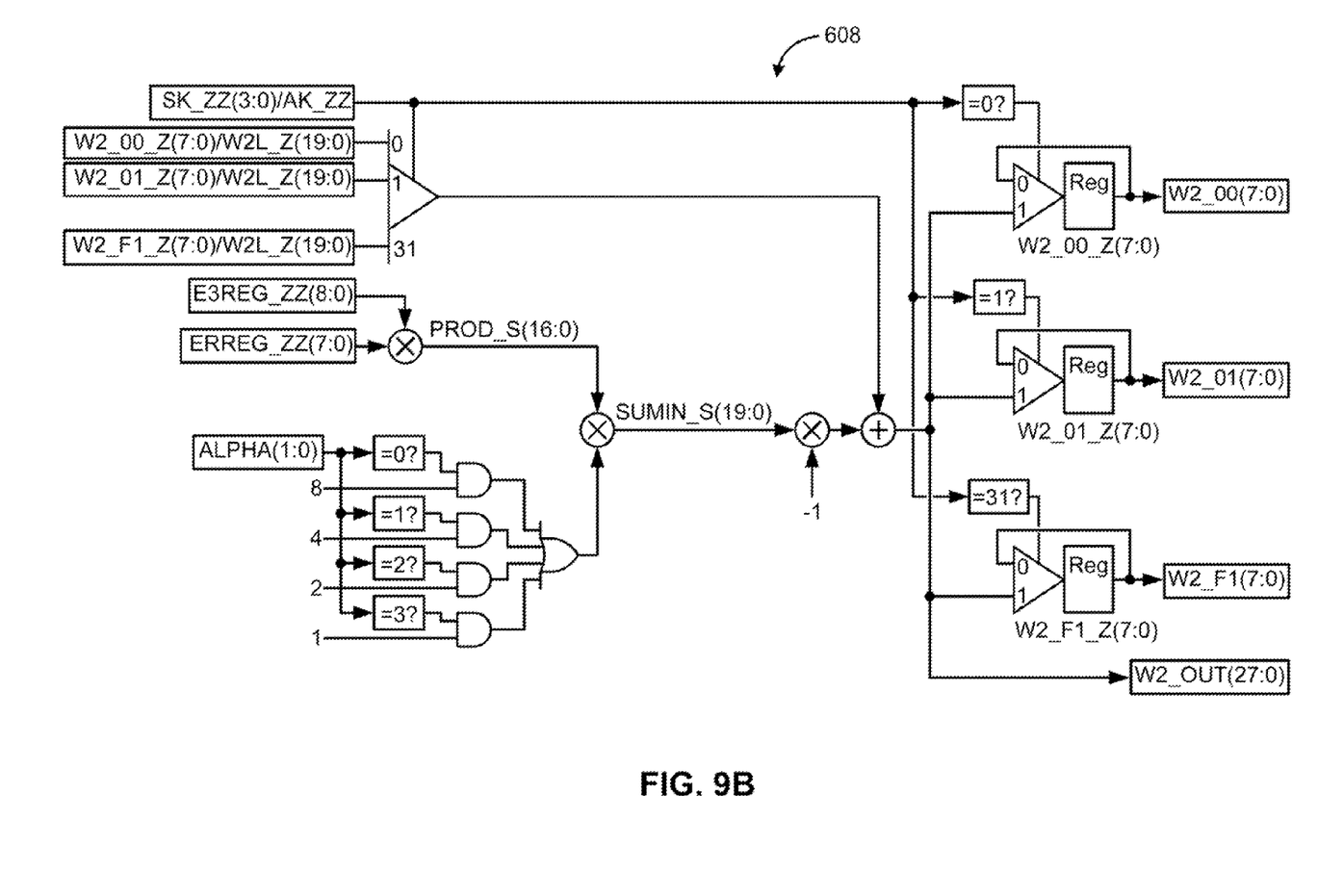

Referring to FIGS. 9A-9B, according to some approaches, there may be two LMS taps (606, 608) that may be used to generate the array of 64 Predictor Coefficients, which include 32 copies of W1 and W2. The LMS gain may be selected from one of four binary shifts, e.g., $\alpha \in \{0.00001544, 0.00003088, 0.00006176, 0.00012352\}$. For DD-NPML, ACCREG(27:0) represents one of the Predictor Coefficients, W1x or W2x, from the array of 32×2 coefficients.

Although the first block diagram shows the Variance Engine 114 as a block completely separate from the LMS engine 112, in some embodiments, the input to the Variance Engine 114 is the prediction error. This is generated by the Error Generator which is part of the LMS engine 112. The Variance Engine 114 can roughly be broken into two parts: the variance calculation, and the variance post-processing.

Figure 10:
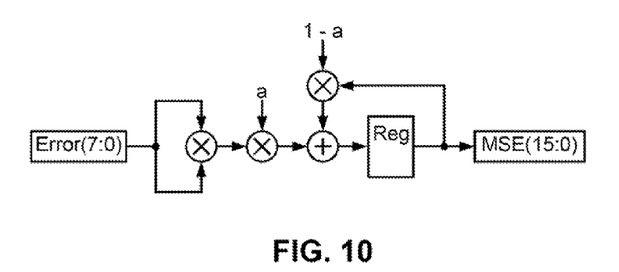
FIG. 10 shows a simplified drawing of a mean square error (MSE) filter, according to one embodiment.

A simplified drawing of a mean square error (MSE) filter is shown in FIG. 10, according to one embodiment. The gain coefficient is fixed to a=1/2048=0.0005, in some approaches. Of course, other gain values may also be used. The error is obtained from the output of the whitening filter in the LMS block. As shown in FIG. 10, $MSE(n) = a \cdot error^2(n) + (1-a) \cdot MSE(n-1)$.

Figure 11:
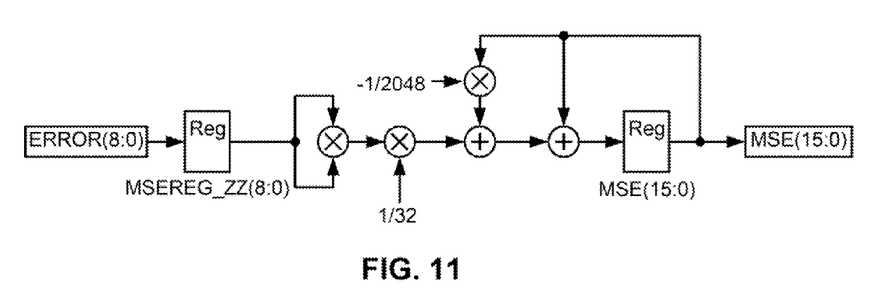
FIG. 11 shows a block diagram of a MSE filter, in one embodiment.

A simplified block diagram of the MSE filter is shown in FIG. 11, according to another embodiment. In FIG. 11, there are several inputs and outputs for the MSE filter. Those which have not been described previously include, ERROR(8:0), which may be a 9-bit number where $-8.0 \leq$ ERROR(8:0) $\leq +8.0$ d, according to one embodiment. Another variable is MSEREG_ZZ(8:0), which may be a 9-bit number where $-8.0 \leq$ MSEREG_ZZ(7:0) $\leq +8.0$ d, in one approach. Also, in some embodiments, $MSEREG\_ZZ(8:0)^2$ may be an 18-bit positive number where $0.0 \leq MSERREG\_ZZ(8:0)^2 \leq +64.0$ d.

According to some embodiments, for $MSEREG\_ZZ(8:0)^2$, 1.0 d is represented by 1024 d (0x400). In the MSE accumulator, 1.0 d is represented by 65536 (0x10000). If this value was added directly to the MSE accumulator, then the gain would be 65536/1024=64. As mentioned in the above discussion, the target gain is 1/2048. Thus, $MSEREG\_ZZ(8:0)^2$ may be truncated/rounded so that 1.0 d is represented by 32 d (0x20). In some approaches, the variable $MERREG\_ZZ(7:0)^2/32$ may be a 16-bit positive number where $0.0 \leq MSEREG\_ZZ(8:0)^2/32 \leq +63.99$ d. Also, in some embodiments, output MSE(15:0) may be a 16-bit positive number where 0x8000 (32768)=0.5, 0xFFFF (63535)=0.99998, and $0.0 \leq$ MSE(15:0) $\leq +0.99998$ d.

Figure 12:
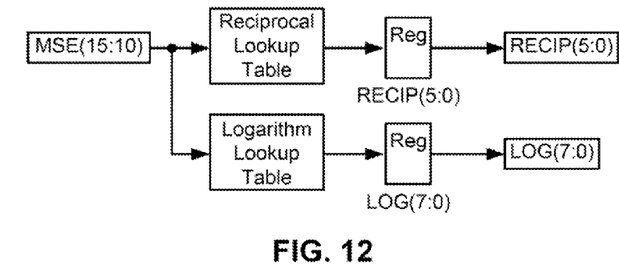
FIG. 12 shows a simplified block diagram of the reciprocal and logarithm calculation via lookup table, in one embodiment.

A simplified block diagram of the reciprocal and logarithm calculation via lookup table is shown in FIG. 12, according to one embodiment. In FIG. 12, there are several inputs and outputs shown for this calculation. Those which have not been described previously include RECIP(5:0) (the reciprocal of the MSE register–MSE(15:0)), which may be a 6-bit positive number where $1 \leq$ RECIP(5:0) $\leq +63$, and $1.0 \leq$ RECIP(5:0) $\leq +63.0$, according to one embodiment. Also, variable LOG(7:0) (the natural logarithm of the MSE register–MSE(15:0)) may be an 8-bit positive number where $0.0157 \leq$ LOG(7:0) $\leq +7.9688$. As for the LMS Engine (112, FIG. 1), the input error may be a function of the binary sequence $\hat{a}_k, \hat{a}_{k-1}, \ldots \hat{a}_{k-4}$, according to one approach, so only one error variance may be calculated at a time (one out of 32). With appropriate switching, 32 variances may be stored in an array and all 32 variances may use one set of error filter logic.

Two lookup tables are used by the calculation shown in FIG. 12, a Reciprocal Lookup Table and a Logarithm Lookup Table. An example of each table appears below as Table 2 and Table 3, respectively, for illustrative purposes based on using a 16-state NPML detector.

Table 2 includes five columns, numbered 1-5. Column 1 indicates the input to the lookup table, e.g., MSE(15:10). Column 2 indicates the 6-bit output of the lookup table, which is the reciprocal of the MSE. Column 3 shows a representation of the input to the lookup table in floating point notation. Column 4 shows a representation of the output of the lookup table in floating point notation. Column 5 shows the quantized representation of the output of the lookup table.

Table 3 includes five columns, numbered 1-5. Column 1 indicates the input to the lookup table, e.g., MSE(15:10). Column 2 indicates the 8-bit output of the lookup table, which is the natural logarithm of the MSE. Column 3 shows a representation of the input to the lookup table in floating point notation. Column 4 shows a representation of the output of the lookup table in floating point notation. Column 5 shows the quantized representation of the output of the lookup table. These lookup tables may be included in an implementation of the MSE filter, according to some embodiments.

Figure 13:
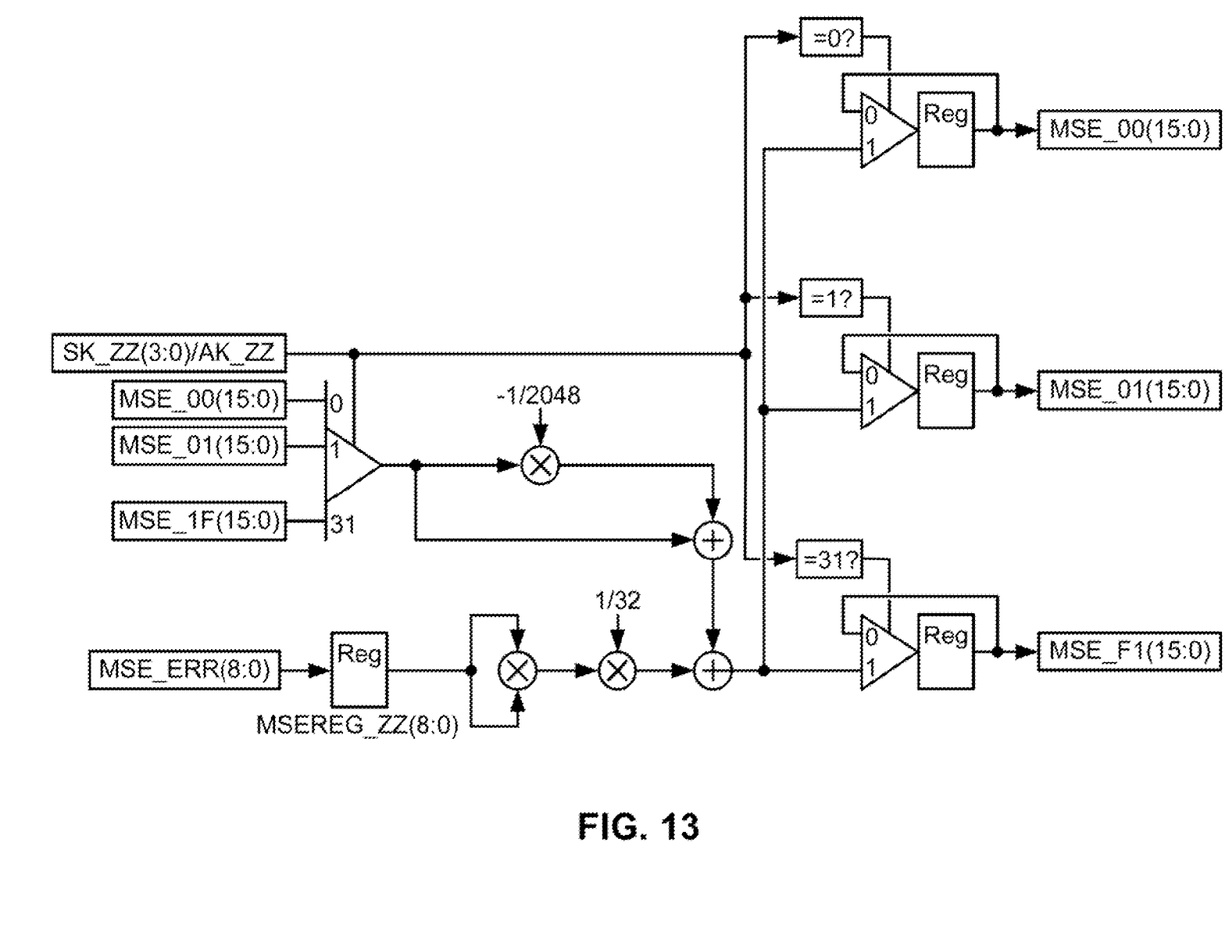
FIG. 13 shows a hardware implementation of the MSE filter, in one embodiment.

In addition, a hardware implementation of the MSE filter is shown in FIG. 13, according to one embodiment. Of course, other hardware implementations may be used, and the configuration shown in FIG. 13 is illustrative only, and not meant to be limiting in any way.

TABLE 2

Reciprocal Lookup Table

| 1 | 2 | 3 | 4 | 5 |
|---|---|---|---|---|
| 0 | 0x3F | [0.0159] | 63.0000 | [63] |
| 1 | 0x3F | [0.0159] | 63.0000 | [63] |
| 2 | 0x20 | [0.0313] | 32.0000 | [32] |
| 3 | 0x15 | [0.0469] | 21.3333 | [21] |
| 4 | 0x10 | [0.0625] | 16.0000 | [16] |
| 5 | 0x0D | [0.0781] | 12.8000 | [13] |
| 6 | 0x0B | [0.0938] | 10.6667 | [11] |
| 7 | 0x09 | [0.1094] | 9.1429 | [9] |
| 8 | 0x08 | [0.1250] | 8.0000 | [8] |
| 9 | 0x07 | [0.1406] | 7.1111 | [7] |
| 10 | 0x06 | [0.1563] | 6.4000 | [6] |
| 11 | 0x06 | [0.1719] | 5.8182 | [6] |
| 12 | 0x05 | [0.1875] | 5.3333 | [5] |
| 13 | 0x05 | [0.2031] | 4.9231 | [5] |
| 14 | 0x05 | [0.2188] | 4.5714 | [5] |
| 15 | 0x04 | [0.2344] | 4.2667 | [4] |
| 16 | 0x04 | [0.2500] | 4.0000 | [4] |
| 17 | 0x04 | [0.2656] | 3.7647 | [4] |
| 18 | 0x04 | [0.2813] | 3.5556 | [4] |
| 19 | 0x03 | [0.2969] | 3.3684 | [3] |
| 20 | 0x03 | [0.3125] | 3.2000 | [3] |
| 21 | 0x03 | [0.3281] | 3.0476 | [3] |
| 22 | 0x03 | [0.3438] | 2.9091 | [3] |
| 23 | 0x03 | [0.3594] | 2.7826 | [3] |
| 24 | 0x03 | [0.3750] | 2.6667 | [3] |
| 25 | 0x03 | [0.3906] | 2.5600 | [3] |
| 26 | 0x02 | [0.4063] | 2.4615 | [2] |
| 27 | 0x02 | [0.4219] | 2.3704 | [2] |
| 28 | 0x02 | [0.4375] | 2.2857 | [2] |
| 29 | 0x02 | [0.4531] | 2.2069 | [2] |
| 30 | 0x02 | [0.4688] | 2.1333 | [2] |
| 31 | 0x02 | [0.4844] | 2.0645 | [2] |
| 32 | 0x02 | [0.5000] | 2.0000 | [2] |
| 33 | 0x02 | [0.5156] | 1.9394 | [2] |
| 34 | 0x02 | [0.5313] | 1.8824 | [2] |
| 35 | 0x02 | [0.5469] | 1.8286 | [2] |
| 36 | 0x02 | [0.5625] | 1.7778 | [2] |
| 37 | 0x02 | [0.5781] | 1.7297 | [2] |
| 38 | 0x02 | [0.5938] | 1.6842 | [2] |
| 39 | 0x02 | [0.6094] | 1.6410 | [2] |
| 40 | 0x02 | [0.6250] | 1.6000 | [2] |
| 41 | 0x02 | [0.6406] | 1.5610 | [2] |
| 42 | 0x02 | [0.6563] | 1.5238 | [2] |
| 43 | 0x01 | [0.6719] | 1.4884 | [1] |
| 44 | 0x01 | [0.6875] | 1.4545 | [1] |
| 45 | 0x01 | [0.7031] | 1.4222 | [1] |
| 46 | 0x01 | [0.7188] | 1.3913 | [1] |
| 47 | 0x01 | [0.7344] | 1.3617 | [1] |
| 48 | 0x01 | [0.7500] | 1.3333 | [1] |
| 49 | 0x01 | [0.7656] | 1.3061 | [1] |
| 50 | 0x01 | [0.7813] | 1.2800 | [1] |
| 51 | 0x01 | [0.7969] | 1.2549 | [1] |
| 52 | 0x01 | [0.8125] | 1.2308 | [1] |
| 53 | 0x01 | [0.8281] | 1.2075 | [1] |
| 54 | 0x01 | [0.8438] | 1.1852 | [1] |
| 55 | 0x01 | [0.8594] | 1.1636 | [1] |
| 56 | 0x01 | [0.8750] | 1.1429 | [1] |
| 57 | 0x01 | [0.8906] | 1.1228 | [1] |
| 58 | 0x01 | [0.9063] | 1.1034 | [1] |
| 59 | 0x01 | [0.9219] | 1.0847 | [1] |
| 60 | 0x01 | [0.9375] | 1.0667 | [1] |
| 61 | 0x01 | [0.9531] | 1.0492 | [1] |
| 62 | 0x01 | [0.9688] | 1.0323 | [1] |
| 63 | 0x01 | [0.9844] | 1.0159 | [1] |

TABLE 3

Logarithm Lookup Table

| 1 | 2 | 3 | 4 | 5 |
|---|---|---|---|---|
| 0 | 0xFF | [0.0159] | 7.9688 | [255] |
| 1 | 0x85 | [0.0159] | 4.1589 | [133] |
| 2 | 0x6F | [0.0313] | 3.4657 | [111] |
| 3 | 0x62 | [0.0469] | 3.0603 | [98] |
| 4 | 0x59 | [0.0625] | 2.7726 | [89] |
| 5 | 0x52 | [0.0781] | 2.5494 | [82] |
| 6 | 0x4C | [0.0938] | 2.3671 | [76] |
| 7 | 0x47 | [0.1094] | 2.2130 | [71] |
| 8 | 0x43 | [0.1250] | 2.0794 | [67] |
| 9 | 0x3F | [0.1406] | 1.9617 | [63] |
| 10 | 0x3B | [0.1563] | 1.8563 | [59] |
| 11 | 0x38 | [0.1719] | 1.7610 | [56] |
| 12 | 0x36 | [0.1875] | 1.6740 | [54] |
| 13 | 0x33 | [0.2031] | 1.5939 | [51] |
| 14 | 0x31 | [0.2188] | 1.5198 | [49] |
| 15 | 0x2E | [0.2344] | 1.4508 | [46] |
| 16 | 0x2C | [0.2500] | 1.3863 | [44] |
| 17 | 0x2A | [0.2656] | 1.3257 | [42] |
| 18 | 0x29 | [0.2813] | 1.2685 | [41] |
| 19 | 0x27 | [0.2969] | 1.2144 | [39] |
| 20 | 0x25 | [0.3125] | 1.1632 | [37] |
| 21 | 0x24 | [0.3281] | 1.1144 | [36] |
| 22 | 0x22 | [0.3438] | 1.0678 | [34] |
| 23 | 0x21 | [0.3594] | 1.0234 | [33] |
| 24 | 0x1F | [0.3750] | 0.9808 | [31] |
| 25 | 0x1E | [0.3906] | 0.9400 | [30] |
| 26 | 0x1D | [0.4063] | 0.9008 | [29] |
| 27 | 0x1C | [0.4219] | 0.8630 | [28] |
| 28 | 0x1A | [0.4375] | 0.8267 | [26] |
| 29 | 0x19 | [0.4531] | 0.7916 | [25] |
| 30 | 0x18 | [0.4688] | 0.7577 | [24] |
| 31 | 0x17 | [0.4844] | 0.7249 | [23] |
| 32 | 0x16 | [0.5000] | 0.6931 | [22] |
| 33 | 0x15 | [0.5156] | 0.6624 | [21] |
| 34 | 0x14 | [0.5313] | 0.6325 | [20] |
| 35 | 0x13 | [0.5469] | 0.6035 | [19] |
| 36 | 0x12 | [0.5625] | 0.5754 | [18] |
| 37 | 0x12 | [0.5781] | 0.5480 | [18] |
| 38 | 0x11 | [0.5938] | 0.5213 | [17] |
| 39 | 0x10 | [0.6094] | 0.4953 | [16] |
| 40 | 0x0F | [0.6250] | 0.4700 | [15] |
| 41 | 0x0E | [0.6406] | 0.4453 | [14] |
| 42 | 0x0D | [0.6563] | 0.4212 | [13] |
| 43 | 0x0D | [0.6719] | 0.3977 | [13] |
| 44 | 0x0C | [0.6875] | 0.3747 | [12] |
| 45 | 0x0B | [0.7031] | 0.3522 | [11] |
| 46 | 0x0B | [0.7188] | 0.3302 | [11] |
| 47 | 0x0A | [0.7344] | 0.3087 | [10] |
| 48 | 0x09 | [0.7500] | 0.2877 | [9] |
| 49 | 0x09 | [0.7656] | 0.2671 | [9] |
| 50 | 0x08 | [0.7813] | 0.2469 | [8] |
| 51 | 0x07 | [0.7969] | 0.2271 | [7] |

TABLE 3-continued

Logarithm Lookup Table

| 1 | 2 | 3 | 4 | 5 |
|---|---|---|---|---|
| 52 | 0x07 | [0.8125] | 0.2076 | [7] |
| 53 | 0x06 | [0.8281] | 0.1886 | [6] |
| 54 | 0x05 | [0.8438] | 0.1699 | [5] |
| 55 | 0x05 | [0.8594] | 0.1515 | [5] |
| 56 | 0x04 | [0.8750] | 0.1335 | [4] |
| 57 | 0x04 | [0.8906] | 0.1158 | [4] |
| 58 | 0x03 | [0.9063] | 0.0984 | [3] |
| 59 | 0x03 | [0.9219] | 0.0813 | [3] |
| 60 | 0x02 | [0.9375] | 0.0645 | [2] |
| 61 | 0x02 | [0.9531] | 0.0480 | [2] |
| 62 | 0x01 | [0.9688] | 0.0317 | [1] |
| 63 | 0x01 | [0.9844] | 0.0157 | [1] |

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents

What is claimed is:

1. A method comprising:
applying one or more whitening filters to an input stream of digitized samples from a magnetic data channel to produce a filtered sequence;
performing one or more branch metric calculations to the filtered sequence to produce a branch metric; and
applying a data-dependent multi-state noise-predictive maximum likelihood (DD-NPML) detector to the branch metric to produce an output stream; and
using a least mean squared (LMS) engine to produce an array of predictor coefficients.

2. The method as recited in claim 1, wherein the magnetic data channel is produced from a magnetic tape drive.

3. The method as recited in claim 1, wherein the method is performed at least in part in hardware.

4. The method as recited in claim 1, wherein an N-state DD-NPML detector is used, where N∈4, 8, 16, 32, 64, wherein the N-state DD-NPML detector comprises a mean square error (MSE) filter adapted to derive the variance of the data-dependent noise.

5. The method as recited in claim 4, wherein 2×N whitening filters are used, each of the 2×N whitening filters comprising a finite impulse response (FIR) filter with two programmable taps.

6. The method as recited in claim 5, wherein the 2×N whitening filters apply a calculation to the input stream, the calculation being represented by $z_k = y_k - p_1(\underline{a}) y_{k-1} - p_2(\underline{a}) y_{k-2}$, where $z_k$ is the filtered sequence, $y_k$ is the input stream, $p_1(\underline{a})$ is a first programmable 8-bit function of a binary sequence $(\underline{a})$ from the input stream, and $p_2(\underline{a})$ is a second programmable 8-bit function of a binary sequence from the input stream, wherein N=16,
wherein the input stream and the filtered sequence are each 9-bit words,
wherein the N-state DD-NPML detector is fully adaptable using least mean square (LMS) filtering techniques to derive predictor filter coefficients, and
wherein the N-state DD-NPML detector is configured to perform noise prediction on a data pattern basis.

7. The method as recited in claim 4, wherein 2×N branch metric calculations are used, each of the branch metric calculations being of the form $$m_k = \ln(\sigma^2(\underline{a})) + \frac{[z_k - \hat{z}_k(\underline{a})]^2}{\sigma^2(\underline{a})},$$

where $m_k$ is the branch metric, $\sigma^2(\underline{a})$ is a variance of the binary sequence $(\underline{a})$ from the input stream, $z_k$ is the filtered sequence, and $\hat{z}_k(\underline{a})$ is a mean calculation of an expected binary sequence as compared to the binary sequence $(\underline{a})$ from the input stream.

8. The method as recited in claim 7, further comprising using a variance engine which produces an array of 2×N variance calculations based on an output of the N-state DD-NPML detector.

9. The method as recited in claim 8, wherein the 2×N branch metric calculations use the array of 2×N variance calculations as $\sigma^2(\underline{a})$.

10. The method as recited in claim 7, wherein the LMS engine produces an array of 4×N predictor coefficients.

11. The method as recited in claim 10, wherein the 2×N branch metric calculations and the 2×N whitening filters use the array of 4×N predictor coefficients.

12. A multi-channel data storage system, comprising:
a head for reading data from a storage medium;
logic configured to apply one or more whitening filters to an input stream of digitized samples from a magnetic data channel to produce a filtered sequence;
logic configured to perform one or more branch metric calculations to the filtered sequence to produce a branch metric;
logic configured to apply a multi-state data-dependent noise-predictive maximum likelihood (DD-NPML) detector to the branch metric to produce an output stream; and
a variance engine which produces variance calculations based on an output of the DD-NPML detector.

13. The multi-channel data storage system as recited in claim 12, wherein the samples in the magnetic data channel are produced from a magnetic tape drive, and wherein the magnetic data channel is synchronized and gain-adjusted.

14. The multi-channel data storage system as recited in claim 12, wherein each of the one or more whitening filters comprises a finite impulse response (FIR) filter with two programmable taps.

15. The multi-channel data storage system as recited in claim 14, wherein the one or more whitening filters apply a calculation to the input stream, the calculation being represented by $z_k = y_k - p_1(\underline{a}) y_{k-1} - p_2(\underline{a}) y_{k-2}$, where $z_k$ is the filtered sequence, $y_k$ is the input stream, $p_1(\underline{a})$ is a first programmable tap function of a binary sequence $(\underline{a})$ from the input stream, and $p_2(\underline{a})$ is a second programmable tap function of a binary sequence from the input stream.

16. The multi-channel data storage system as recited in claim 12, wherein each of the one or more branch metric calculations are of the form $$m_k = \ln(\sigma^2(\underline{a})) + \frac{[z_k - \hat{z}_k(\underline{a})]^2}{\sigma^2(\underline{a})},$$

where $m_k$ is the branch metric, $\sigma^2(\underline{a})$ is a variance of the binary sequence $(\underline{a})$ from the input stream, $z_k$ is the filtered sequence, and $\hat{z}_k(\underline{a})$ is a mean calculation of an expected binary sequence as compared to the binary sequence $(\underline{a})$ from the input stream.

17. The multi-channel data storage system as recited claim 16, wherein the variance engine produces an array of variance calculations based on an output of the multi-state DD-NPML detector, and wherein the one or more branch metric calculations use the array of variance calculations as $\sigma^2(a)$.

18. The multi-channel data storage system as recited in claim 16, further comprising a least mean squared (LMS) engine which produces an array of predictor coefficients, and wherein the one or more branch metric calculations and the one or more whitening filters use the array of predictor coefficients.

19. The multi-channel data storage system as recited in claim 12, wherein a number of the one or more whitening filters and a number of the one or more branch metric calculations is equal to twice the number of states in the multi-state DD-NPML detector.

20. A multi-channel data storage system, comprising:
a head for reading data from a storage medium;
logic for applying one or more whitening filters to an input stream of digitized samples from a magnetic data channel to produce a filtered sequence;
logic for performing one or more branch metric calculations to the filtered sequence to produce a branch metric;
logic for applying a multi-state data-dependent noise-predictive maximum likelihood (DD-NPML) detector to the branch metric to produce an output stream; and
a least mean squared (LMS) engine which produces an array of predictor coefficients, and wherein the one or more branch metric calculations and the one or more whitening filters use the array of predictor coefficients.

* * * * *